(12) United States Patent
Kim et al.

(10) Patent No.: US 8,576,956 B2
(45) Date of Patent: Nov. 5, 2013

(54) METHOD FOR DETECTING RANDOM ACCESS SIGNAL

(75) Inventors: Hyung Jin Kim, Gyeryong-si (KR); Seong Chul Cho, Daejeon (KR); Dae Ho Kim, Daejeon (KR); Yeong Jin Kim, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 873 days.

(21) Appl. No.: 12/541,304

(22) Filed: Aug. 14, 2009

(65) Prior Publication Data

US 2010/0150277 A1 Jun. 17, 2010

(30) Foreign Application Priority Data

Dec. 16, 2008 (KR) .................. 10-2008-0127873

(51) Int. Cl.
*H04L 27/06* (2006.01)
(52) U.S. Cl.
USPC ........... 375/340; 375/316; 375/259; 375/260; 375/219

(58) Field of Classification Search
USPC .................. 375/340, 316, 259, 260, 219
See application file for complete search history.

(56) References Cited

U.S. PATENT DOCUMENTS

| 2006/0140314 | A1* | 6/2006 | Kim et al. | 375/343 |
|---|---|---|---|---|
| 2008/0165903 | A1* | 7/2008 | Hooli et al. | 375/343 |
| 2008/0267303 | A1* | 10/2008 | Baldemair et al. | 375/260 |
| 2009/0109919 | A1* | 4/2009 | Bertrand et al. | 370/330 |
| 2009/0213968 | A1* | 8/2009 | Tormalehto | 375/343 |

FOREIGN PATENT DOCUMENTS

| KR | 1020060074310 | 7/2006 |
|---|---|---|
| KR | 1020070106914 | 11/2007 |

* cited by examiner

*Primary Examiner* — Kenneth Lam
(74) *Attorney, Agent, or Firm* — Nelson Mullins Riley & Scarborough LLP (57) ABSTRACT

Provided is a method for detecting random access signal, and the method includes detecting a peak position of a random access signal in a first preamble section and ignoring the random access signal apart from the peak position for less than a certain distance in a second preamble section adjacent to the first preamble section.

11 Claims, 8 Drawing Sheets

METHOD FOR DETECTING RANDOM ACCESS SIGNAL

CROSS-REFERENCE TO RELATED APPLICATIONS

This application claims priority under 35 U.S.C. §119 to Korean Patent Application No. 10-2008-0127873, filed on Dec. 16, 2008 the disclosure of which is incorporated herein by reference in its entirety.

TECHNICAL FIELD

The present disclosure relates to a method for detecting random access signal, and in particular, to a technology which decreases the probability of a false alarm caused by the spread of a peak value when detecting a Physical Random Access Channel (PRACH) signal in a 3rd Generation Partnership Protocol-Long Term Evolution (3GPP-LTE) system.

BACKGROUND

Figure 1:
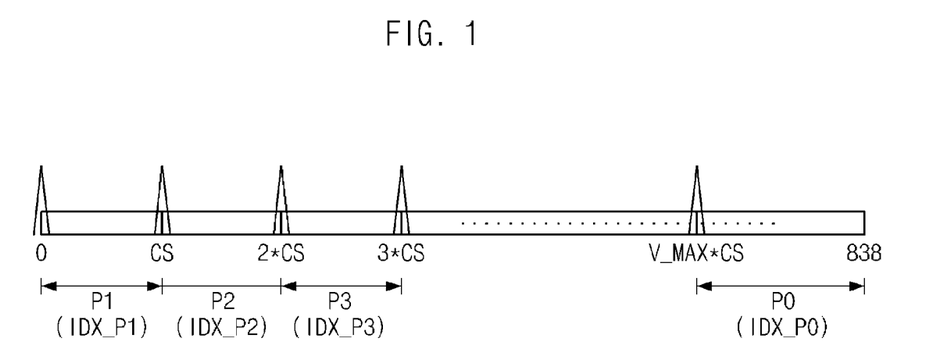
FIGS. 1 to 4 are conceptual diagrams for describing a random access signal.

The peaks of random access signals used for random access in a 3GPP-LTE system exist as illustrated in FIG. 1, if the random access signal is accurately synchronized with a base-station reference signal. FIG. 1 shows a preamble sequence, and the random access signal is accurately synchronized with the base-station reference signal when the peak of the random access signal exists in each of index values 0, CS, 2×CS, 3×CS and V_MAX×CS. Preamble sections P1, P2, P3 and P0 correspond to preamble index values IDX_P1, IDX_P2, IDX_P3 and IDX_P0 respectively.

However, there must be a delay equal to a time taken for the random access signal to travel from the terminal to the base station, because the random access signal is not synchronized with the base station but with a downlink signal only, because it is a very first signal that a terminal sends to access a base station. Such a delay allows the position of a peak to be shifted to the left. In FIG. 1, a Cyclic Shift (CS) value is designed to be larger than the shift value of a peak value where the delay of the random access signal is the maximum, in consideration of a radius of a cell. Accordingly, when there exists a peak in the range of the index values 1 to CS, the base station determines that the peak existing in the index value CS has been shifted by the delay and determines it as a random access signal corresponding to the peak existing in the index value CS. That is, the base station determines it as the random access signal of a first preamble section P1. Meanwhile, the respective preamble sections P1, P2, P3 and P0 have different preamble index values IDX_P1, IDX_P2, IDX_P3 and IDX_P0. The base station calculates the preamble index values IDX_P1, IDX_P2, IDX_P3 and IDX_P0, and determines which of the preamble sections P1, P2, P3 and P0 a received random access signal is in. As another example, when a peak occurs between the index values CS+1 and 2×CS, the base station determines that the peak in the index value 2×CS has been shifted. That is, the base station determines it as the random access signal of a second preamble section P2. A random access signal, in which a peak exists in the range of the index values CS+1 to 2×CS, has a preamble index value different from a preamble index value of a random access signal where a peak exists in the range of the index values 1 to CS.

Figure 2:
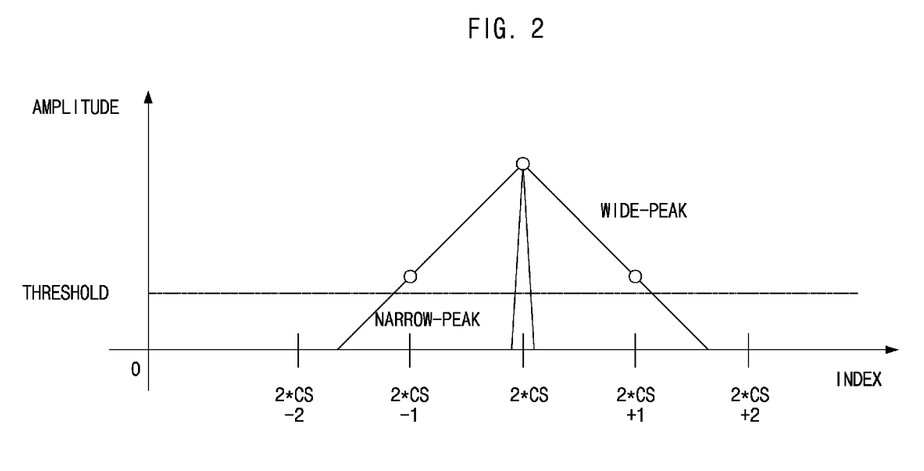

As illustrated in FIG. 1, a random access signal fades and spreads sideways due to noise while passing through a wireless channel. According to the extent of spread, a peak can be classified into a narrow peak and a wide peak. FIG. 2 illustrates the shapes of the narrow peak and the wide peak. A narrow-peak signal has only one peak index value exceeding a threshold value, but, on the other hand, a wide-peak signal has one or more peak index values exceeding the threshold value.

Figure 3:
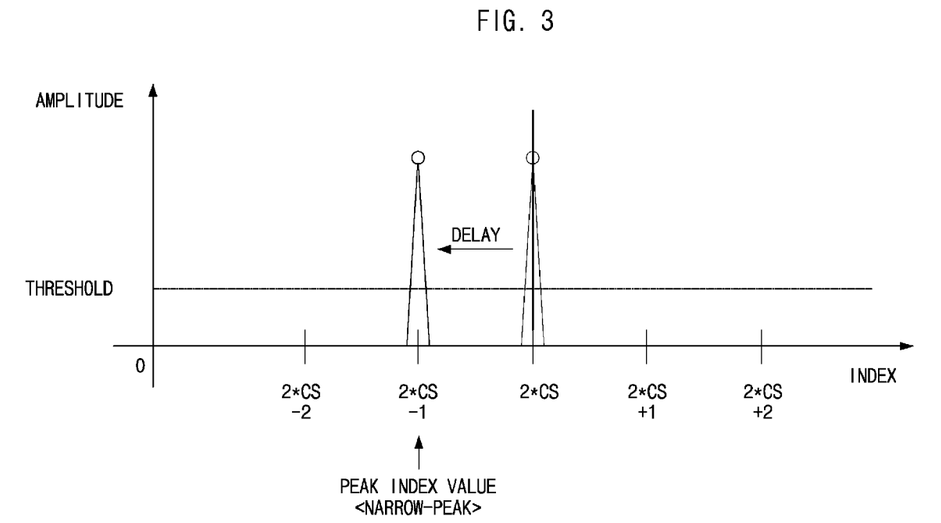

FIG. 3 illustrates a received random access signal which is a narrow-peak signal and shifted by a delay. Herein, the peak index value exceeding the threshold value exists in an index value 2×CS−1. In this case, it is determined that a peak existing in the index value 2×CS is shifted, and thus the random access signal is detected.

Figure 4:
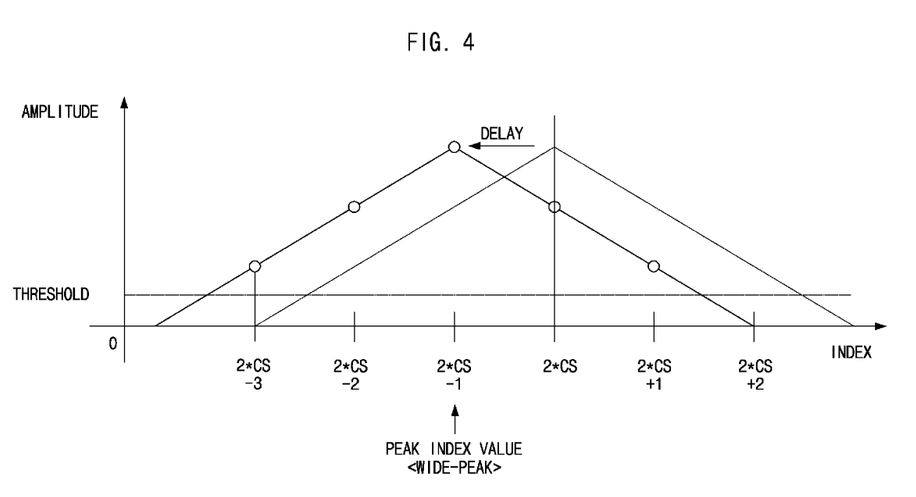

As shown in FIG. 4, in a case where a delay exists in the wide-peak signal, an index value exceeding the threshold value widely exists around a reference-peak index value in a random access signal. In this case, when a peak is detected, a peak existing in index values 2×CS+1 to 2×CS is determined as a signal, which is a random access signal existing in the index value 2×CS, received with or without delay, and a random access signal existing in the index value 2×CS+1 is determined as a signal that is generated by the delay of a random access signal existing in the index value 3×CS. At this point, a false alarm occurs due to the spread of a peak value.

There is an attempt to increase the threshold value as one of methods for decreasing a false alarm. However, the method of increasing the threshold value makes it difficult to detect the signal when the amplitude of the random access signal is small, and thus decreases the probability of detection.

SUMMARY

Accordingly, the present disclosure provides a method for detecting random access signal in a 3GPP-LTE system, which decreases a false alarm caused by wrong detection of other adjacent random access signal whose peak value has been widely spread while passing through a wireless channel.

The objects of the present invention are not limited to the above-described object, and the objects and advantages of the present invention other than the above-described object can be understood by description below and will be more apparent with reference to the embodiments of the present invention.

According to an aspect of the present invention, a method for detecting random access signal includes: detecting a peak position of the random access signal in a first preamble section; and ignoring the random access signal apart from the peak position for less than a certain distance in a second preamble section adjacent to the first preamble section.

According to another aspect, a method for detecting random access signal includes: sequentially indexing on a detection position of the random access signal; calculating an amplitude of the random access signal for each current index value; determining which of first and second preamble sections each current index value is in; determining the current index value of the random access signal having the largest amplitude among the each current index value belonging to the first preamble section as a peak index value; and ignoring a random access signal of a current index value, in which a difference from the peak index value is less than a predetermined peak ignorance region value, among the current index values belonging to the second preamble section.

According to another embodiment, an apparatus for detecting random access signal includes: a detection unit detecting a peak position of a random access signal in a first preamble section; and a determination unit ignoring the random access signal apart from the peak position for less than a certain distance in a second preamble section adjacent to the first preamble section and determining the random access signal as the random access signal of the first preamble section.

The specific matters of other embodiments are included in detailed description and the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 5:
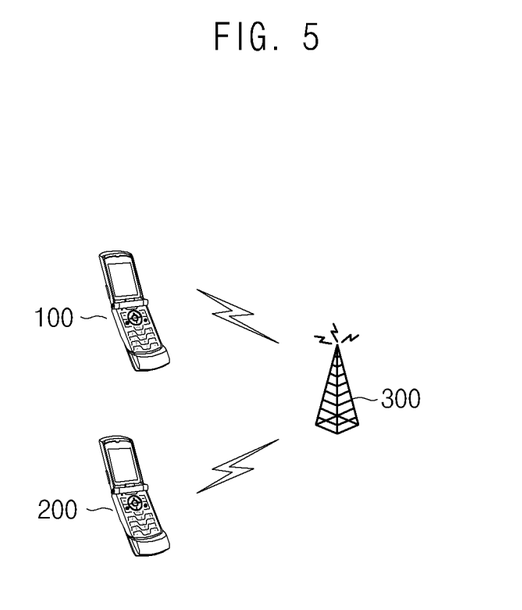
FIG. 5 is a configuration diagram of a mobile communication system.
Figure 6:
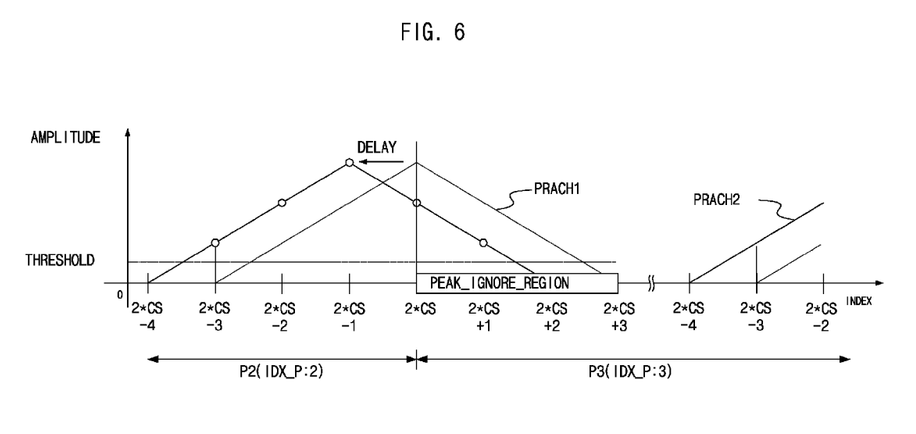
FIG. 6 is a conceptual diagram for describing the method for detecting random access signal according to an embodiment of the present invention.
Figure 7:
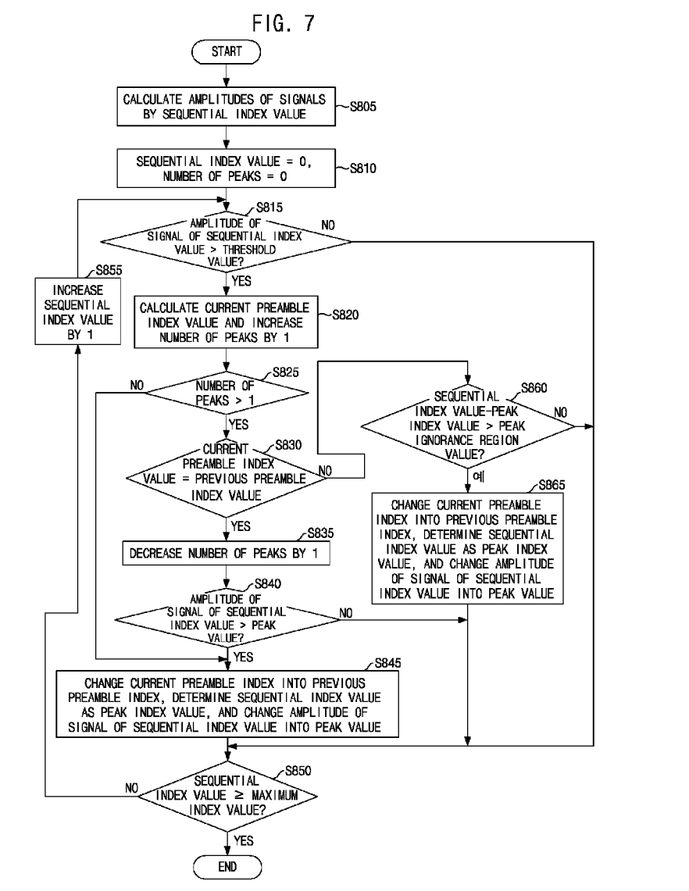
FIG. 7 is a flowchart illustrating the method for detecting random access signal according to an embodiment of the present invention.

Hereinafter, a method for detecting random access signal according to an embodiment of the present invention will be described with reference to FIGS. 5 to 7. FIG. 5 is a configuration diagram of a mobile communication system. FIG. 6 is a conceptual diagram for describing the method for detecting random access signal according to an embodiment of the present invention. FIG. 7 is a flowchart illustrating the method for detecting random access signal according to an embodiment of the present invention.

Referring to FIG. 5, a mobile communication system includes mobile terminals 100 and 200, and a base station 300.

Terminals 100 and 200 transmit a random access signal through PRACH when power turned on or an uplink synchronization should be reestablished to change the status into active state after idle mode is maintained for a long time. The base station 300 detects the random access signal transmitted from the terminals 100 and 200. Specifically, when the base station 300 receives a random access signal PRACH1 illustrated in FIG. 6 from the terminal 100, it detects a position in which the amplitude of the random access signal PRACH1 has the maximum value (hereinafter, referred to as a peak index value) in each detection position (hereinafter, referred to as a sequential index value) of a second preamble section P2, and ignores the random access signal PRACH1 of the sequential index value, which is within a certain distance from the peak index value, in the second preamble section P2. More specifically, the base station 300 detects a peak index value 2×CS−1 having the largest amplitude of the random access signal PRACH1 in a sequential index value equal to or less than an index value 2×CS. In a sequential index value larger than the index value 2×CS, the base station 300 sets a peak ignorance region PEAK_IGNORE_REGION and ignores the amplitude of a signal even though the amplitude of the signal is larger than a threshold value. Consequently, the base station 300 detects a peak index value.

That is, according to the method according to an embodiment of the present invention, the peak index value 2×CS−1 is detected as a peak position in the random access signal PRACH1 where a peak is spread as shown in FIG. 6. For this, the method detects a sequential index value having the largest amplitude of the random access signal PRACH1 in the sequential index value equal to or less than the index value 2×CS. In a sequential index value larger than the index value 2×CS, the method sets the peak ignorance region PEAK_IGNORE_REGION and ignores the amplitude of a signal even though the amplitude of the signal is larger than the threshold value. Accordingly, the method ignores a sequential index value 2×CS+1 and enables to accurately detect the peak index value 2×CS−1 as a peak index.

Hereinafter, a more detailed description will be made with further reference to FIG. 7 on a method where the base station 300 detects the random access signal PRACH1.

First, it is assumed that the random access signal PRACH1 illustrated in FIG. 6 is received. In the random access signal PRACH1, a peak which must be disposed in the sequential index value 2×CS is shifted to the peak index value 2×CS−1 due to a delay. That is, the random access signal PRACH1 is widely disposed over the two preamble sections P2 and P3, and the peak index value 2×CS−1 exists in the second preamble section P2.

The base station 300 calculates the amplitude of the received random access signal PRACH1 for each sequential index value in step S805. Herein, the sequential index value is a detection position for detecting the random access signal PRACH1, and may be sequentially indexed in each position to be detected. Furthermore, the base station 300 sets a sequential index value into '0', and sets the number of peaks into '0'. This is for detecting the random access signal PRACH1 in the entire section of the preamble sequence illustrated in FIG. 1. When the random access signal PRACH1 does not exist before the second preamble section P2 among the preamble sequence, the sequential index value becomes '2×CS−4' through step S855 where the base station 300 increases the sequential index value by '1', and the number of peaks becomes '0'.

Subsequently, the base station 300 determines whether the amplitude of the random access signal PRACH1 of the sequential index value 2×CS−4 is larger than a predetermined threshold value THRESHOLD. Since the amplitude of the random access signal PRACH1 of the sequential index value 2×CS−4 is less than the threshold value THRESHOLD, the base station 300 determines whether the sequential index value is equal to or larger than the maximum index value, for example, 838 (see FIG. 1). This is for detecting the random access signal PRACH1 in the entire section of the preamble sequence illustrated in FIG. 1 as described above. Since the sequential index value 2×CS−4 is less than the maximum index value, the base station 300 increases the sequential index value by '1' in step S855. Accordingly, the sequential index value becomes '2×CS−3'.

The base station 300 determines whether the amplitude of the random access signal PRACH1 of the sequential index value 2×CS−3 is larger than the threshold value THRESHOLD in step S815. Since the amplitude of the random access signal PRACH1 of the sequential index value 2×CS−3 is larger than the threshold value THRESHOLD, the base station 300 calculates a current preamble index value IDX_P2, and increases the number of peaks by '1' in step S820. Calculating the current preamble index value IDX_P2 means determining which of the preamble sections P2 and P3 the sequential index value is in. For example, the calculated current preamble index value IDX_P2 becomes '2'.

Next, the base station 300 determines whether the number of peaks is more than '1' in step S825. This is to determine whether the amplitude of the random access signal PRACH1 of the sequential index value is larger than the threshold value THRESHOLD for the first time. Since the number of peaks is not more than '1', the base station 300 sets the current preamble index value IDX_P2 of 2 into a previous preamble index value, determines the sequential index value 2×CS−3 as a peak index value, and changes the amplitude of the random access signal PRACH1 of the sequential index value into a peak value in step S845. Subsequently, the base station 300 determines whether the sequential index value is equal to or larger than the maximum index value in step S850. Since the sequential index value 2×CS−3 is less than the maximum index value of 838, the base station 300 increases the sequential index value by '1' in step S855.

The base station 300 determines that the amplitude of the random access signal PRACH1 of the sequential index value 2×CS−2 is larger than the threshold value THRESHOLD in step S815. At this point, the base station 300 calculates the current preamble index value IDX_P2, and increases the number of peaks by '1' in step S820.

Since the sequential index value 2×CS−2 is in the second preamble section P2, the current preamble index value IDX_P2 is '2', and the number of peaks is '2'. Subsequently, since the number of peaks is more than '2', the base station 300 determines whether the current preamble index value IDX_P2 is the same as a previous preamble index value in step S830. Since the current preamble index value IDX_P2 is the same as the previous preamble index value IDX_P2, i.e., the sequential index values 2×CS−3 and 2×CS−2 are in the same preamble section P2, the base station 300 decreases the number of peaks by '1' in step S835.

The base station 300 determines whether the amplitude of the random access signal PRACH1 of the sequential index value is larger than a peak value in step S840. Since the amplitude of the random access signal PRACH1 of the sequential index value 2×CS−2 is larger than the peak value (the amplitude of the random access signal PRACH1 of the sequential index value 2×CS−3), the base station 300 changes the amplitude of the random access signal PRACH1 of the sequential index value 2×CS−2 into the peak value, and determines the sequential index value as a peak index value in step S845.

Next, the base station 300 increases the sequential index value by '1' by repeating step S855, and performs the above-described steps S815 to S850 on the sequential index value 2×CS−1. Then, a peak index value becomes '2×CS−1', and a peak value becomes the amplitude of the random access signal PRACH1 of the sequential index value 2×CS−1.

Subsequently, the base station 300 increases the sequential index value by '1' by performing the step S855 again, and performs the above-described steps S815 to S850 on the sequential index value 2×CS. Then, a peak index value becomes '2×CS−1', and a peak value becomes the amplitude of the random access signal PRACH1 of the sequential index value 2×CS−1.

The base station 300 performs the step S855 again to increase the sequential index value by '1', and calculates a current preamble index value IDX_P3 on the sequential index value 2×CS+1 in step S820. In this case, the current preamble index value IDX_P3 of the sequential index value 2×CS+1 becomes '3'. That is, the sequential index value 2×CS+1 is in a third preamble section P3.

When it is determined that the current preamble index value IDX_P3 is the same as the previous preamble index value IDX_P2 in step S830, they are different from each other, where the current preamble index value IDX_P3 is '3', and the previous preamble index value IDX_P2 is '2'. The base station 300 compares the difference between the sequential index value 2×CS+1 and the peak index value 2×CS−1 with a peak ignorance region value in step S860. That is, the base station 300 determines whether the sequential index value 2×CS+1 is within a certain distance from the peak index value 2×CS−1. When the difference between the sequential index value 2×CS+1 and the peak index value 2×CS−1 is '2' and is less than the peak ignorance region value, for example, '4', the base station 300 ignores the random access signal PRACH1 of the sequential index value 2×CS+1, increases the sequential index value by '1' through the step S855, and repeats the above-described steps. At this point, the previous preamble index value IDX_P2 is '2', and the peak index value is '2×CS−1'.

Accordingly, when the first random access signal PRACH1 illustrated in FIG. 6 is received, the base station 300 detects the peak index value 2×CS−1, and determines the received random access signal PRACH1 as the random access signal PRACH1 of the third preamble index value IDX_P3.

In a case where the sequential index value is '3×CS−3', the amplitude of the random access signal PRACH1 is larger than the threshold value THRESHOLD, and the current preamble index value IDX_P3 is '3', which is different from the previous preamble index value IDX_P2. Then, if the difference between the sequential index value and the peak index value is larger than the peak ignorance region value (i.e., the sequential index value is farther away from the peak index value than a certain distance), the base station 300 changes the current preamble index value IDX_P3 into the previous preamble index value IDX_P2, determines the sequential index value as the peak index value, and determines the amplitude of the random access signal PRACH2 of a sequential index value 3×CS−3 as a peak value. As described above, the base station 300 increases the sequential index value by '1' and repetitively performs the above-described steps. This is for detecting the second random access signal PRACH2. The second random access signal PRACH2 may be the random access signal PRACH2 transmitted from another terminal 200 of FIG. 5.

That is, while the base station 300 sequentially increases the sequential index value in the entire section of the preamble sequence, it detects the peak position (for example, the peak index value 2×CS−1) of the random access signal PRACH1 in one preamble section (for example, the second preamble section P2), ignores the random access signal PRACH1 within a certain distance (i.e., the peak ignorance region PEAK_IGNORE_REGION) from the peak index among adjacent preamble section (for example, the third preamble section P3), and determines the random access signal PRACH1 as the random access signal PRACH1 of one preamble section (for example, the second preamble section P2).

Figure 8:
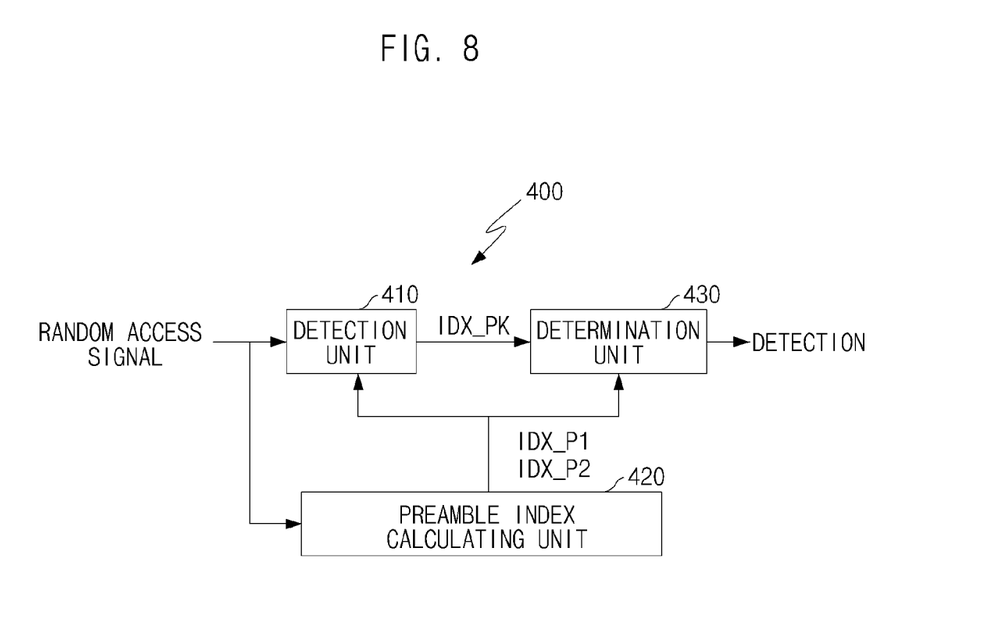
FIG. 8 is a block diagram of an apparatus for detecting random access signal according to another embodiment of the present invention.

The following description will be made with reference to FIG. 8 on an apparatus for detecting random access signal according to another embodiment of the present invention. FIG. 8 is a block diagram of an apparatus for detecting random access signal according to another embodiment of the present invention.

Referring to FIG. 8, the apparatus 400 for detecting random access signal according to another embodiment of the present invention includes a detection unit 410, a preamble index calculating unit 420, and a determination unit 430. The apparatus 400 may be included in the base station 300 of FIG. 5.

First, when the random access signal PRACH1 illustrated in FIG. 6 is received from the terminal 100, the detection unit 410 detects the peak position of the random access signal PRACH1 in the second preamble section P2, i.e., a peak index value IDX_PK. For example, the detection unit 410 first determines whether the amplitude of the random access signal PRACH1 is larger than a predetermined threshold value for each detection position, and may compare the amplitude of the random access signal PRACH1 of the each detection position to detect the peak index value IDX_PK.

The detection unit 410 can recognize whether each detection position is in the second preamble section P2 or in the third preamble section P3 through the preamble index calculating unit 420. That is, the preamble index calculating unit 420 may calculate preamble index values IDX_P1 and IDX_P2 and inform the detection unit 410 of the first and second preamble sections P1 and P2.

The determination unit 430 ignores a random access signal which is apart from the peak index value IDX_PK for less than a certain distance in the third preamble section P3 adjacent to the second preamble sections P2, and determines the random access signal PRACH1 as the random access signal of the second preamble section P2. The determination unit 430 may determine the random access signal PRACH2 which is farther away from the peak index value IDX_PK for a certain distance as the random access signal of the third preamble section P3.

Embodiments of the present invention accurately detect the largest peak of values exceeding the threshold value in one preamble section when receiving the random access signal having the peak value that is spread while passing through the wireless channel in the 3GPP-LTE system, and thereby increase the reception accuracy of the random access signal. Moreover, embodiments of the present invention can decrease the probability of the false alarm caused by wrong detecting the random access signal of an adjacent preamble section.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims. For example, the present invention may be embodied in different forms such as record medium where a program for realizing a control method of the present invention is recorded.

What is claimed is:

1. A method for detecting a random access signal in a mobile communication system, the method comprising:
    detecting a peak position of a random access signal in a first preamble section;
    identifying a region in a second preamble section adjacent to the first preamble section, the region within a specified distance of the detected peak position; and
    ignoring the random access signal apart from the peak position within the region in the second preamble section adjacent to the first preamble section.

2. The method of claim 1, wherein the detecting of the peak position comprises:
    determining whether an amplitude of the random access signal is larger than a predetermined threshold value for each detection position; and
    comparing the amplitude of the random access signal, which is larger than the threshold value, of each detection position to each other.

3. The method of claim 1, further comprising:
    calculating a preamble index value dividing the first and second preamble sections; and
    determining where the random access signal is disposed in either the first or the second preamble section, using the calculated preamble index value in each detection position.

4. The method of claim 1, further comprising determining the random access signal as a random access signal of the first preamble section.

5. The method of claim 4, further comprising determining, if a random access signal exists farther away from the peak position for more than the certain distance, the random access signal existing farther away from the peak position for more than the certain distance as a random access signal of the second preamble section.

6. A method for detecting a received random access signal in a mobile communication system, the method comprising:
    sequentially indexing a plurality of detection positions of a random access signal;
    calculating an amplitude of the random access signal for each current index value;
    determining which of first and second preamble sections each of the current index value is in;
    determining the current index value of the random access signal having the largest amplitude among the current index values belonging to the first preamble section as a peak index value;
    identifying a region in a second preamble section adjacent to the first preamble section, the region within a specified distance of the detected peak position; and
    ignoring a random access signal of a current index value, within the region, among the current index values belonging to the second preamble section.

7. The method of claim 6, wherein the determining of a position of the index value comprises:
    calculating a preamble index value dividing the first and second preamble sections for each current index value; and
    comparing the preamble index value of the current index value to each other.

8. The method of claim 6, wherein the determining of the peak index value comprises:
    determining whether an amplitude of the random access signal of each current index value is larger than a predetermined threshold value; and comparing the amplitude of the random access signal of each current index value larger than the threshold value to each other.

9. The method of claim 6, wherein the ignoring of the random access signal comprises:
   determining whether an amplitude of a random access signal of a current index value belonging to the second preamble section is larger than the predetermined threshold value; and
   ignoring the current index value belonging to the second preamble section larger than the threshold value and the random access signal where a difference from the peak index value is less than the predetermined peak ignorance region value.

10. The method of claim 6, further comprising determining the random access signal as a random access signal of the first preamble section.

11. The method of claim 10, further comprising determining a random access signal of a current index value, in which a difference from the peak index value is larger than the predetermined peak ignorance region value, among each current index value belonging to the second preamble section as the random access signal of the second preamble section.

\* \* \* \* \*